United States Patent [19]

Scheidel et al.

[11] Patent Number: 4,972,992
[45] Date of Patent: Nov. 27, 1990

[54] DEVICE FOR HEATING PASSENGER SPACES IN POWER VEHICLES

[75] Inventors: Wolfgang Scheidel; Trudpert Meier, both of Bühl; Horst Schicht, Gifhorn; Hans Schlepper, Wolfsburg, all of Fed. Rep. of Germany

[73] Assignee: Robert Bosch GmbH, Stuttgart, Fed. Rep. of Germany

[21] Appl. No.: 371,418

[22] Filed: Jun. 26, 1989

[30] Foreign Application Priority Data

Jul. 11, 1988 [DE] Fed. Rep. of Germany ....... 3823448

[51] Int. Cl.$^5$ .............................................. B60H 1/02
[52] U.S. Cl. ............................... 237/12.3 A; 165/103; 165/42; 98/2.08
[58] Field of Search ...................... 237/12.3 B, 12.3 A; 165/42, 43, 103; 98/2.08

[56] References Cited

U.S. PATENT DOCUMENTS 4,852,638  4/1989  Hildebrand et al. ............. 165/43 X

FOREIGN PATENT DOCUMENTS 1227334  4/1971  United Kingdom ................. 98/2.08
1361188  7/1974  United Kingdom ................. 98/2.08
2106637  4/1983  United Kingdom ................. 98/2.08

Primary Examiner—Albert J. Makay
Assistant Examiner—John Sollecito
Attorney, Agent, or Firm—Michael J. Striker

[57] ABSTRACT

A device for heating a passenger space in a power vehicle comprises a main passage for supplying air, an intermediate passage associated with the main passage and branching into side passages connected with a passenger space, a heat exchanger, a branching passage leading from the main passage over the heat exchanger, a guiding element movable between and fixable in at least two end positions for air to connect the branching passage with the main passage and to separate the former from the latter so that in a flow direction of the air the air enters behind the heat exchanger in the intermediate passage, a blowing nozzle opening in a passenger space and connected with the intermediate passage, the intermediate passage being subdivided in partial passages, one of the partial passages being connected with the blowing nozzle while the other of the partial passages merging into the side passages, the guiding element in its operative position in which it connects the branching passage with the main passage opens a channel to one of the partial passages and blocks the other of the partial passages.

8 Claims, 4 Drawing Sheets

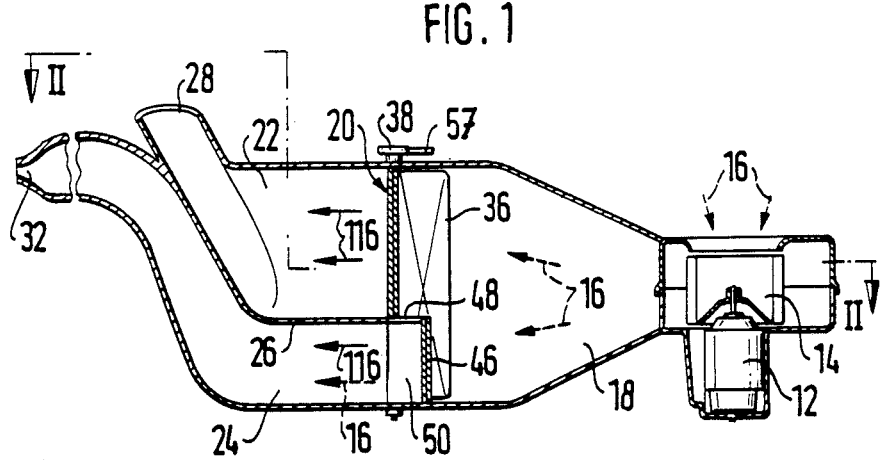
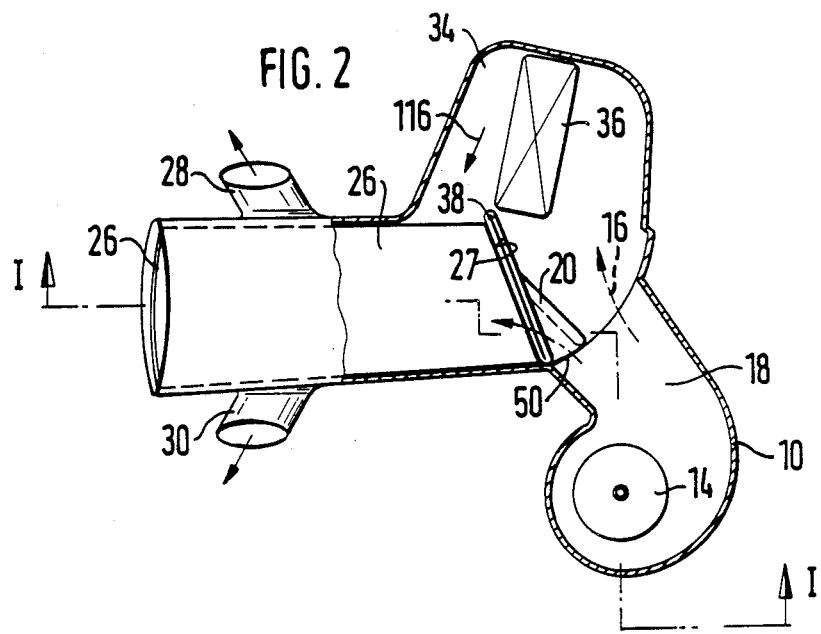

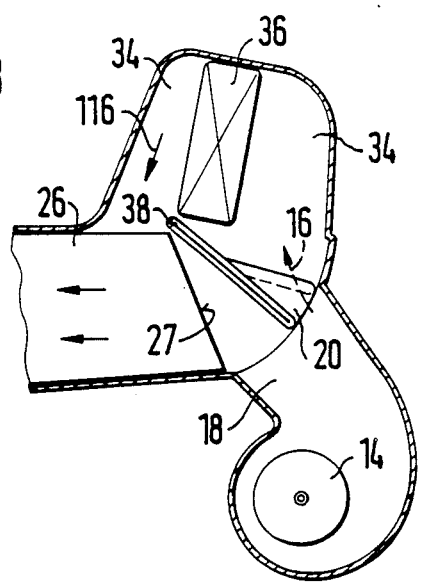
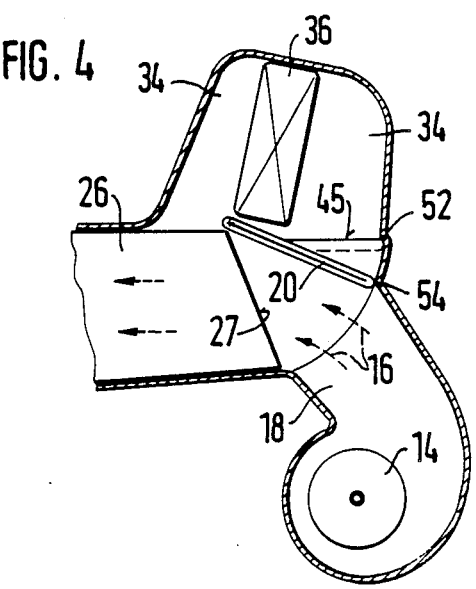

FIG. 5
FIG. 6
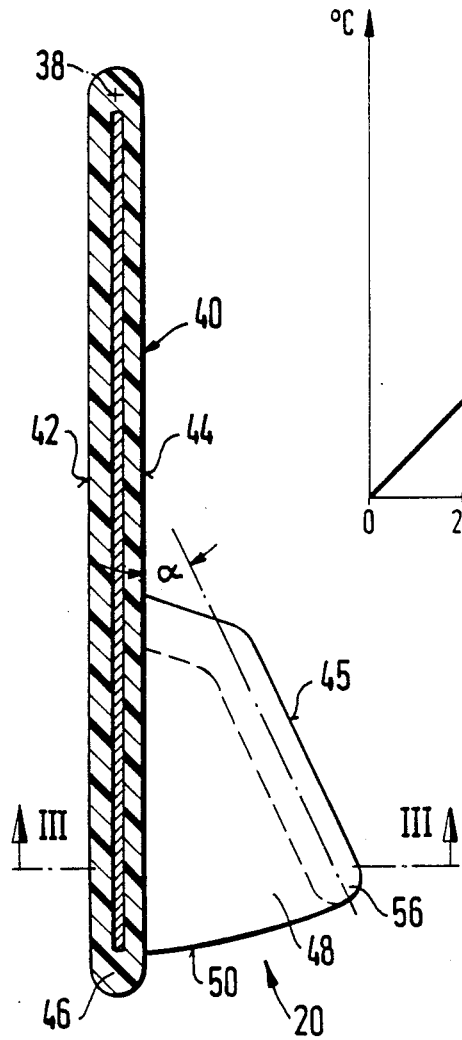
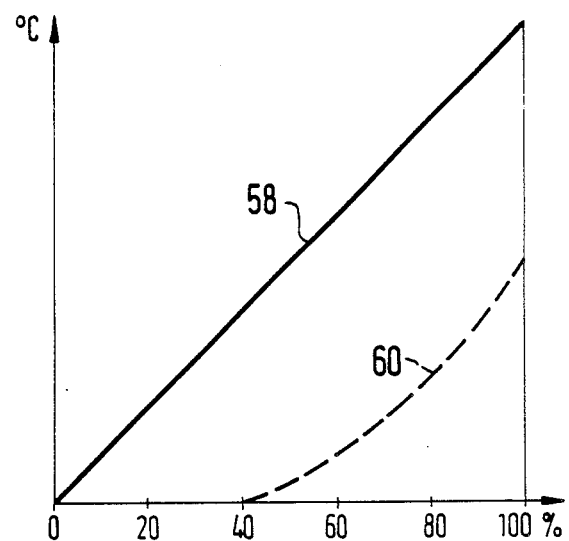

DEVICE FOR HEATING PASSENGER SPACES IN POWER VEHICLES

BACKGROUND OF THE INVENTION

The present invention relates to a device for heating passenger spaces in power vehicles.

Devices of the above mentioned general type are known in the art. Such a heating device in use provides for heating the air in an intermediate passage to a preselected temperature. When this air is heated to a maximum degree when it is required due to the respective weather, the air which flows out of a blowing nozzle of the intermediate passage can lead to an overheating of a head part in the passenger space of the power vehicle when the nozzle supplied from the side passages is spaced further from the heat exchanger than the blowing nozzle of the intermediate passage. In practice, the main nozzle which is directed to the front seat of the vehicle, is connected with the intermediate passage while the side passages lead to side defrosting nozzles directed to the windows or open into the foot space, especially in the rear of the vehicle. Due to the considerable length difference between the individual passages, undesirable temperature differences occur at different nozzles.

SUMMARY OF THE INVENTION

Accordingly, it is an object of the present invention to provide a device for heating passenger spaces in power vehicles, which avoids the disadvantages of the prior art.

In keeping with these objects and with others which will become apparent hereinafter, one feature of the present invention resides, briefly stated, in a device for heating passenger spaces in power vehicles in which the intermediate passage is subdivided into partial passages such that the partial passage is connected with a blowing nozzle, and the other partial passage merges into side passages, and the guiding element in an operative position in which it connects the branching passage with the main passage opens a channel to one partial passage and closes the channel to the other partial passage.

When the device is designed in accordance with these features, it avoids the disadvantages of the prior art. It provides the advantage that in a simple manner, especially without cooling mixing air passage which must be opened when necessary to the intermediate passage, the temperature of the air flowing out from the blowing nozzle is substantially lower than the temperature of the air exiting the other nozzles. An overheating of the head part of the space is reliably prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 i a view showing a longitudinal section of a heating device in accordance with the present invention, taken along the line I—I in FIG. 2;

FIG. 2 is a view showing a partial section of the heating device of FIG. 1, taken along the line II—II, with a guiding element located in its one end position;

FIG. 3 is a view showing a part of the heating device of FIG. 2, with a guiding element in its intermediate position;

FIG. 4 is a view showing another part of the heating device of FIG. 2, with the guiding element in its other end position;

FIG. 5 is a view showing a section of the guiding element taken along the line II—II in FIG. 1, on an enlarged scale;

FIG. 6 is a view showing a diagram illustrating the outlet temperature of air exiting different nozzles, in dependence upon the operational position of the guiding element.

DESCRIPTION OF A PREFERRED EMBODIMENT

Figure 7:
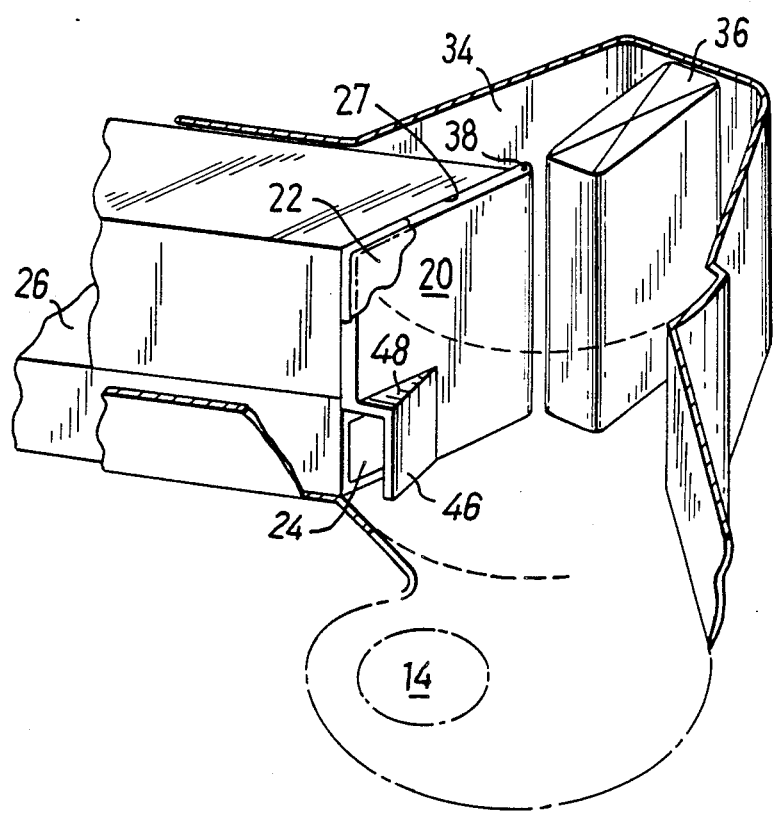
FIG. 7 is a perspective view of the heating device in accordance with the present invention.

An arrangement of heating a passenger space of a not shown power vehicle is illustrated in FIG. 1. It has a housing 10 for accommodating a fan unit with an electric drive motor 12 and a fan wheel 14. During the operation the fan unit 12, 14 transports fresh or surrounding air aspirated from the environment through the housing 10 as shown with the arrows 16.

The fresh air is first supplied into a main passage 18 and from there, depending on the position of a guiding element 20 into an intermediate passage arranged after the main passage 18. The intermediate passage in the shown embodiment is subdivided into two partial passages 22 and 24 located one under the other. They are separated by a separating wall 26 which is shown in FIG. 1. The partial passage 22 which is located above merges into side passages 28 and 30. The partial passage 24 which is located below leads to a blowing nozzle 32 which opens into the not shown passenger space of the power vehicle and preferably is directed toward the front seat position. The side passages 28 and 30 lead to not shown window defrosting nozzles or to blowing nozzles arranged in a foot area of the passenger space.

A branching passage 34 is located in the housing 10. A heat exchanger 36 is arranged in this branching passage. With the respective position of the air guiding element 20, the air stream is supplied through the branching passage 34 over the heat exchanger 36. As considered in the flow direction of the air, the air enters the heat exchanger 36 from behind in the partial passages 22 and 24. The air guiding element is formed as a flap 20 movable about a pivot axis 38 between two end positions. One end position of the flap 20 is shown in FIG. 2, while the other end position of the flap 20 is shown in FIG. 4. The turning flap 20 is fixable in each of the two end positions as well as in any arbitrary intermediate position. One of such intermediate positions is shown in FIG. 3.

In the end position shown in FIG. 2, the flap 20 abuts against the separating wall 26 and more particularly at its end side 27 facing the flap. It can also be seen from the drawing that the turning axis 38 of the air guiding flap 20 extends transversely to the flow direction of the air identified with the arrow, as will be explained hereinbelow. The air guiding flap 20 has a substantially plate-shaped region 40 its upper surface 42 comes to abutment against the end surface 27 of the separating wall 26. A plate side 44 which faces of the intermediate wall 26 has a projection 45 extending beyond the plate of the flap. When the flap 20 abuts against the separating wall 26, the projection 46 projects from the flap and more particularly from its surface 44 facing away of the separating wall.

The extension of the projecting portion 45 is selected so that it merges into the middle region between the pivot axis 38 of the flap and the free end 36 of the flap. In the shown embodiment the angle of offset α of the portion 45 relative to the plane of the plate amounts to approximately 30°. As can be seen specifically from FIGS. 1 and 5, the projecting portion 45 of the flap 20 is connected with the latter through a cover plate 48 located in an extension plane of the separating wall 26. On a plan view of FIG. 5 a so-called scoop 50 is formed in the guiding flap 20. In a respective operational position of the air guiding flap 20 the scoop 50 is arranged so that it scoops a partial air flow from the main passage 18 and guides the same into another direction.

In the operational position of the air guiding flap 20 shown in FIG. 4, abutment shoulders 52 and 54 are associated with it in the region of the branching passage of the housing. In this operational position the air guiding flap 20 abuts with its free end 45 against the shoulder 54, while the free end 56 of the projecting portion 45 comes to abutment against the abutment shoulder 52. As can be further seen from FIG. 1, the air guiding flap 20 can be actuated via a control lever 57, or in other words, it can be turned about its pivot axis 38.

The operation of the heating device with the air guiding flap in the operational positions shown in FIGS. 1 and 2 is as follows. The fresh air aspirated by the fan 12, 14 as identified with a broken arrow 16 is supplied after this through the main passage 18 and the air guiding flap 20 into the intermediate passage 38 to be heated by the heat exchanger 36. The heated air is identified with the solid arrow identified with reference numeral 116. The heated air 116 flows at the entrance in the intermediate passage both into the upper partial passage 22 and into the lower partial passage 24. In the transisition region between the main passage 18 and branching passage 34 the scoop 50 of the air guiding flap 20 scoops a part of the fresh air 16 and leads the same on a direct path into the lower partial passage 24. This fresh air is identified in FIG. 1 in the partial passage 24 with reference numeral 16. Since the height of the scoop 50 corresponds to the height of the lower partial passage 24, the scooped fresh air 16 flows exclusively into the lower partial passage 24. The upper partial passage 24 is passed through exclusively by the hot air 116 heated in the heat exchanger 36. It is believed to be clear that the air which flows in the partial passage 24 has a substantially lower temperature than the air flowing in the partial passage 22 which is supplied through the side passage 28 to another nozzle. This is achieved in that the guiding element 20 in its operational position connecting the branching passage 34 with the main passage 18 shown in FIG. 2 provides a through-going channel namely the scoop 50, while the other upper partial passage 22 is blocked and can be supplied only through the branching passage 34 with heated air 116.

In the operational position of the air guiding passage 20 shown in FIG. 3, a small portion of the fresh air 16 flows through the branching passage 34 and heated by the heat exchanger 36. The greater portion of the air is supplied directly by the air guiding flap 20 into the intermediate passages 22, 24, from where it is supplied through the side passages 28 or through the blowing nozzle 32 into the passenger space of the power vehicle. In the operational position shown in FIG. 4, the branching passage is completely blocked. Thereby the fresh air 16 is supplied from the main passage 18 directly into the intermediate passages 22, 24 and from there to the associated blowing nozzles.

In the diagram shown in FIG. 6, the ordinate represents the blowing out temperature, while the abscissa represents the turning angle of the air guiding flap in percentages. The solid line shows the temperature course of the nozzle supplied from the partial passage 22 while the broken curve 60 shows the temperature course of the air exiting the blowing nozzle 32. It can be easily seen that the temperature of the air exiting the blowing nozzle 32 remains behind the temperature of the air exiting the other nozzle.

It will be understood that each of the elements described above, or two or more together, may also find a useful application in other types of constructions differing from the types described above.

While the invention has been illustrated and described as embodied in a device for heating passenger spaces of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for heating a passenger space in a power vehicle, comprising a main passage for supplying air; an intermediate passage associated with said main passage and branching into side passages connected with a passenger space; a heat exchanger; a branching passage leading from said main passage over said heat exchanger; a guiding element movable between and fixable in at least two end positions for air to connect said branching passage with said main passage and to separate the former from the latter so that in a flow direction of the air the air enters behind said heat exchanger in said intermediate passage; a blowing nozzle opening in a passenger space and connected with said intermediate passage, said intermediate passage being subdivided in partial passages, one of said partial passages being connected with said blowing nozzle while the other of said partial passages merging into said side passages, said guiding element in its operative position in which it connects said branching passage with said main passage opening a channel to one of said partial passages and blocks the other of said partial passages, said guiding element being formed as a flap which is turnable between said at least two end positions and having a pivot axis extending transversely to the flow direction of the air, said intermediate passage having a separating wall forming said two partial passages, said turnable flap in one of said end positions abutting against said separating wall, said flap having a region cooperating with one of said partial passages and provided with a portion which projects relative to a plane of said flap, said portion being formed so that when said flap abuts against said separating wall said portion projects outwardly beyond a flap surface facing away of said separating wall, said portion merges in a central region between said pivot axis of said flap and a free end of said flap.

2. A device as defined in claim 1, wherein said intermediate passage is provided with a separating wall extending in the flow direction of the air and forming partial passages, said separating wall extending to a movement region of said guiding element.

3. A device as defined in claim 1, wherein said portion projects from a remaining portion of said flap by approximately 30°.

4. A device as defined in claim 1, and further comprising a cover plate through which said projecting portion is connected with a remaining portion of said flap.

5. A device as defined in claim 1, wherein said blowing nozzle is arranged so that it opens toward a front seat of the power vehicle.

6. A device for heating a passenger space in a power vehicle, comprising a main passage for supplying air; an intermediate passage associated with said main passage and branching into side passages connected with a passenger space; a heat exchanger; a branching passage leading from said main passage over said heat exchanger; a guiding element movable between and fixable in at least two end positions for air to connect said branching passage with said main passage and to separate the former from the latter so that in a flow direction of the air the air enters behind said heat exchanger in said intermediate passage; a blowing nozzle opening in a passenger space and connected with said intermediate passage, said intermediate passage being subdivided in partial passages, one of said partial passages being connected with said blowing nozzle while the other of said partial passages merging into said side passages, said guiding element in its operative position in which it connects said branching passage with said main passage opening a channel to one of said partial passages and blocks the other of said partial passages, said guiding element being formed as a flap which is turnable between said at least two end positions and having a pivot axis extending transversely to the flow direction of the air, said intermediate passage having a separating wall forming said two partial passages, said turnable flap in one of said end positions abutting against said separating wall, said flap having a region cooperating with one of said partial passages and provided with a portion which projects relative to a plane of said flap, said portion being formed so that when said flap abuts against said separating wall said portion projects outwardly beyond a flap surface facing away of said separating wall, said cover plate being located on an extension of a plane of said separating wall.

7. A device as defined in claim 6, wherein said projecting portion has a free end, said remaining portion of said flap also having a free end, said free end of said projecting portion and said free end of said remaining portion of said flap being associated with a respective one of said abutment shoulders.

8. A device for heating a passenger space in a power vehicle, comprising a main passage for supplying air; an intermediate passage associated with said main passage and branching into side passages connected with a passenger space; a heat exchanger; a branching passage leading from said main passage over said heat exchanger; a guiding element movable between and fixable in at least two end positions for air to connect said branching passage with said main passage and to separate the former from the latter so that in a flow direction of the air the air enters behind said heat exchanger in said intermediate passage; a blowing nozzle opening in a passenger space and connected with said intermediate passage, said intermediate passage being subdivided in partial passages, one of said partial passages being connected with said blowing nozzle while the other of said partial passages merging into said side passages, said guiding element in its operative position in which it connects said branching passage with said main passage opening a channel to one of said partial passages and blocks the other of said partial passages, said guiding element being formed as a flap which is turnable between said at least two end positions and having a pivot axis extending transversely to the flow direction of the air, said intermediate passage having a separating wall forming said two partial passages, said turnable flap in one of said end positions abutting against said separating wall, said flap having a region cooperating with one of said partial passages and provided with a portion which projects relative to a plan of said flap, said portion being formed so that when said flap abuts against said separating wall said portion projects outwardly beyond a flap surface facing away of said separating wall; and abutment shoulders located in the region of said branching passage, said abutment shoulders being located so that when said guiding element is in its operating position in which it separates said branching passage from said main passage said abutment shoulders are associated with said guiding element.

* * * * *